US007970700B2

(12) United States Patent
McAlary

(10) Patent No.: US 7,970,700 B2
(45) Date of Patent: Jun. 28, 2011

(54) FINANCIAL PRODUCTS

(76) Inventor: Michael McAlary, Northbridge (AU)

( * ) Notice: Subject to any disclaimer, the term of this patent is extended or adjusted under 35 U.S.C. 154(b) by 722 days.

(21) Appl. No.: 11/667,964

(22) PCT Filed: Nov. 17, 2005

(86) PCT No.: PCT/AU2005/001751
§ 371 (c)(1),
(2), (4) Date: Feb. 22, 2008

(87) PCT Pub. No.: WO2006/053387
PCT Pub. Date: May 26, 2006

(65) Prior Publication Data
US 2008/0270192 A1 Oct. 30, 2008

(30) Foreign Application Priority Data
Nov. 17, 2004 (AU) ................................ 2004906578

(51) Int. Cl.
G06Q 40/00 (2006.01)
(52) U.S. Cl. ......................................................... 705/38
(58) Field of Classification Search ...................... 705/38
See application file for complete search history.

(56) References Cited

U.S. PATENT DOCUMENTS

| 4,876,648 | A | * | 10/1989 | Lloyd | 705/38 |
| 5,689,649 | A | * | 11/1997 | Altman et al. | 705/36 R |
| 5,704,045 | A | * | 12/1997 | King et al. | 705/35 |
| 5,787,404 | A | * | 7/1998 | Fernandez-Holmann | 705/35 |
| 5,987,436 | A | * | 11/1999 | Halbrook | 705/36 R |
| 2002/0091610 | A1 | * | 7/2002 | Smith | 705/36 |
| 2002/0156709 | A1 | * | 10/2002 | Andrus et al. | 705/35 |
| 2004/0088247 | A1 | * | 5/2004 | Grant et al. | 705/38 |
| 2004/0088248 | A1 | * | 5/2004 | Cutler | 705/38 |
| 2004/0254878 | A1 | * | 12/2004 | Fitzsimmons et al. | 705/38 |
| 2005/0137954 | A1 | * | 6/2005 | Alldredge | 705/36 |
| 2005/0203779 | A1 | * | 9/2005 | Prieston | 705/4 |
| 2006/0229955 | A1 | * | 10/2006 | Ono et al. | 705/35 |
| 2007/0288357 | A1 | * | 12/2007 | Holman et al. | 705/38 |
| 2008/0243666 | A1 | * | 10/2008 | Rowan | 705/37 |

FOREIGN PATENT DOCUMENTS

| AU | 2005100179 | 5/2005 |
| WO | WO 00/73933 A2 | 12/2000 |
| WO | WO 04/001534 A2 | 12/2003 |

OTHER PUBLICATIONS

"Use house equity to bolster porfolio"; Expositor, Brantford, Ontario: Apr. 5, 2002. p. 19.*
The variable universal mortgage product: A product whose time has come, Ed Morrow, Financial Services Advisor, Lexington: May/Jun. 2000. vol. 143, Iss. 3; p. 19 (3 pages).*
A. Morozovsky et al. "A New Loan-Stock Financial Instrument". Jun. 2000.
PCT/AU2005/001751 Written Opinion dated Dec. 7, 2005.
PCT Request Forms.

* cited by examiner

Primary Examiner — Ella Colbert
Assistant Examiner — Mohammad Z Shaikh
(74) Attorney, Agent, or Firm — Harness, Dickey & Pierce, P.L.C.

(57) ABSTRACT

A method and apparatus for providing a financial product from a first party to a second party, wherein a processing system (10) is configured to receive loan parameters relating to a loan from the first party to the second party; and, determine, using the loan parameters and a repayment rule: payments to be paid by the second party to the first party, and an allocation defining: a first portion used for at least partially repaying the principal and/or interest on the loan; and, a second portion used for at least partially acquiring an investment for the second party. The method and apparatus also allows for the financial product to be maintained.

33 Claims, 6 Drawing Sheets

FINANCIAL PRODUCTS

TECHNICAL FIELD

The present invention relates to an apparatus and a method for use in providing financial products. In one particular form, the present invention relates to a method and apparatus for providing combined loan and investment products and services.

BACKGROUND OF THE INVENTION

The reference to any prior art in this specification is not, and should not be taken as, an acknowledgment or any form of suggestion that the prior art forms part of the common general knowledge.

A loan, typically in the form of a sum of money, is property lent from a creditor to a debtor, where the sum is to be paid back from the debtor to the creditor over a period of time. Therefore a loan is generally a temporary transfer of property from a creditor to a debtor. A loan can involve a debtor providing some form of security in order for a loan to be obtained, such as a mortgage on a house, however, it is also common that no security need be provided for other forms of loans, such as a credit card. A loan is generally paid back to the creditor in full and typically is paid back with interest. The interest paid is calculated using methods such as fixed, variable, simple and/or compound interest rates and may be paid daily, weekly, monthly, yearly, in advance etc. A loan, from the debtor's perspective, is commonly referred to in the art as a credit, in terms of a balance sheet.

In contrast, an investment is typically property that is acquired by an investor for obtaining future financial return or benefit over a period of time. For example, money invested in shares in a company is considered a form of investment. By investing in property, typically in the form of money, the investor is able to obtain a financial return or benefit in many possible forms such as profits, interest, or dividends. For example, an investment may be in the form of a savings account with a financial institution, where the funds invested in the account obtain a financial return in the form of interest. An investment, from an investor's perspective, is commonly referred to in the art as a debit, in terms of a balance sheet.

Since a loan is considered a credit transaction and an investment is considered a debit transaction from the debtor's and investor's perspective respectively, these financial mechanisms are quite separate products as they exist on opposite sides of a balance sheet, Thus, financial institutions currently offer separate financial products for loans and investments.

Generally, an entity, such as a customer, may obtain a loan from a first financial institution and invest funds in a second financial institution due to the isolation of these products. It is also possible that a single financial institution may offer separate loan and investment products. However, these products are operated as separate financial transactions due to their opposing nature.

SUMMARY OF THE PRESENT INVENTION

In a first broad form, the present invention provides an apparatus for providing a financial product from a first party to a second party, wherein the apparatus includes a processing system configured to:
  a) receive loan parameters relating to a loan from the first party to the second party; and,
  b) determine, using the loan parameters and a repayment rule:
    (i) payments to be paid by the second party to the first party, and
    (ii) an allocation defining:
      (1) a first portion used for at least partially repaying the principal and/or interest on the loan; and,
      (2) a second portion used for at least partially acquiring an investment for the second party.

Preferably, the loan parameters include at least one of a value of the loan; a term of the loan; a value of the investment to be acquired by the second party; consumer price index; the annual growth rate of the investment; initial investment price; dividend yield percentage; dividend offset; distribution rate; corporate tax rates; and personal tax rates.

Preferably, the processing system is configured to determine the allocation of the first and second portion using an allocation rate.

In one preferred embodiment, the processing system:
  a) receives data indicative of a selection of at least one of:
    (i) a loan repayment option from a plurality of loan repayment options; and
    (ii) an income allocation option from a plurality of income allocation options; and
  b) determines, using the selection, the repayment rule.

It is preferred that the processing system:
  a) determines, using the selection, a maximum allocation rate; and
  b) receives data indicative of the allocation rate selected between a minimum allocation rate equalling zero and the maximum allocation rate.

Preferably, the first party includes at least one of a bank, an investment bank, a finance company, an insurance company, a fund manager, superannuation manager, a hedge fund, an industry organisation, an association, a club, a society, an employee union, an industry cooperative, a Government, a publicly listed corporation, a broker, trust, partnership and a private corporation.

Preferably, the investment includes at least one of warrants, contracts for difference (CFD) and options or other forms of derivatives, shares, superannuation products, a unit trust, managed investment scheme, property, a property trust, a term deposit, a cash management account, bank bills, futures, foreign currency and commodities.

In one preferred embodiment, the processing system is configured to store data indicating that the investment is at least partially used as security for the loan.

Preferably, the processing system is configured to determine, using the loan parameters, whether Lender's Mortgage Insurance is required to be purchased by the second party.

In a preferred embodiment, the processing system is configured to determine a premium for insurance for a shortfall between an outstanding balance at the end of the term of the loan and the value of the investment, and output a value of the premium of the insurance.

Preferably, the processing system is configured to receive data indicating whether the second party has decided to purchase the insurance.

Optionally, the first party is represented by, operates as, or is, the apparatus.

In a second broad form, the present invention provides an apparatus for maintaining a financial product from a first party to a second party, including a processing system configured to:
  a) receive payment data indicative of a payment from the second party to the first party;
  b) determine an allocation defining:
    i) a first portion used for at least partially repaying the principal and/or interest on the loan; and,
    ii) a second portion used for at least partially acquiring an investment;
  c) cause, using the payment data, the investment to be acquired; and, d) update, in a store and using the payment data:
   (i) loan data indicative of a loan status; and,
   (ii) investment data indicative of an investment status.

Preferably the loan status is indicative of at least one of a balance of the loan, when the last payment was made, any overdue payments, redraws, and when any other payments are to be made.

In one preferred embodiment, the investment status is indicative of a value of the investment, the average growth rate of the investment, any income due to the second party from the investment, dividends etc, when the last payment was made, when any portion of the investment was sold, and when any other payments are to be made.

Preferably, the first party acquires at least a portion of the investment when the first party receives less than a minimum payment from the second party.

Preferably, the processing system is configured to determine the allocation by retrieving data stored in a data store.

Preferably, the processing system is configured to determine the allocation using loan parameters and an allocation rate.

The processing system is preferably configured to determine a new value for the allocation before or after receiving a payment from the second party.

In one preferred embodiment, the processing system executes a computer software program in order to maintain the financial product.

Preferably, the second party uses at least a portion of the at least partially acquired investment to make payments to the first party.

Preferably, the processing system is configured to determine if the second party has paid at least one larger payment than required for the financial product.

The processing system is preferably configured to determine any excess portion of payment to be used for repaying the loan or acquiring an investment.

Preferably, the processing system is configured to record an excess rule defined by the second party for determining whether the excess portion of payment is used for repaying the loan or acquiring the investment.

In one preferred embodiment, the excess rule defines a first proportion of excess payment that is used for repaying the loan, and a second proportion that is used for acquiring the investment.

Preferably, if at the end of the loan term a shortfall exists between the balance of the loan and the value of the investment, the processing system is configured to determine whether insurance was purchased by the second party and if insurance was purchased, submit a claim to the insurance company.

Preferably, after a payment is received from the second party, the processing system is configured to analyse the performance of the investment and provide, using current growth and dividend yield of the investment and economic parameters, a prediction of the value of the investment at the end of the loan term.

The processing system is preferably configured to provide a statement including details of the loan and investment status, and the predicted value of the loan and investment at the end of the loan term.

In a third broad form, the present invention provides a method for providing a financial product from a first party to a second party, wherein the method includes, in a processing system:
   a) receiving loan parameters relating to a loan from the first party to the second party; and,
   b) determining, using the loan parameters and a repayment rule:
      (i) payments to be paid by the second party to the first party, and
      (ii) an allocation defining:
         (1) a first portion used for at least partially repaying the principal and/or interest on the loan; and,
         (3) a second portion used for at least partially acquiring an investment for the second party.

Preferably, the loan parameters include at least one of a value of the loan; a term of the loan; a value of the investment to be acquired by the second party; consumer price index; the annual growth rate of the investment; initial investment price; dividend yield percentage; dividend offset; distribution rate; corporate tax rates; and personal tax rates.

Preferably, the method includes, in the processing system, determining the allocation of the first and second portion using an allocation rate.

In one preferred embodiment, the method includes, in the processing system:
   (a) receiving data indicative of a selection of at least one of:
      (ii) a loan repayment option from a plurality of loan repayment options; and
      (ii) an income allocation option from a plurality of income allocation options; and
   (b) determining, using the selection, the repayment rule.

Preferably, the method includes, in the processing system:
   (a) determining, using the selection, a maximum allocation rate; and
   (b) receiving data indicative of the allocation rate selected between a minimum allocation rate equalling zero and the maximum allocation rate.

Preferably, the first party includes at least one of a bank, an investment bank, a finance company, an insurance company, a fund manager, superannuation manager, a hedge fund, an industry organisation, an association, a club, a society, an employee union, an industry cooperative, a Government, a publicly listed corporation, a broker, and a private corporation.

Preferably, the investment includes at least one of warrants and options, contracts for difference (CFD) or other forms of derivatives, shares, superannuation products, a unit trust, managed investment scheme, property, a property trust, a term deposit, a cash management account, bank bills, futures, foreign currency and commodities.

Preferably, the method includes, in the processing system, storing data indicating that the investment is at least partially used as security for the loan.

In one preferred embodiment, the method includes, in the processing system, determining, using the loan parameters, whether Lender's Mortgage Insurance is required to be purchased by the second party.

Preferably, the method includes, in the processing system, determining a premium for insurance for a shortfall between an outstanding balance at the end of the term of the loan and the value of the investment, and outputting a value of the premium of the insurance.

Preferably, the method includes, in the processing system, receiving data indicating whether the second party has decided to purchase the insurance.

In a fourth broad form, the present invention provides a method for maintaining a financial product from a first party to a second party, the method including, in a processing system:
   a) receiving payment data indicative of a payment from the second party to the first party;
   b) determining an allocation defining:
      i) a first portion used for at least partially repaying the principal and/or interest on a loan; and,
      ii) a second portion used for at least partially acquiring an investment;
   c) causing, using the payment data, the investment to be acquired; and, d) updating, in a store and using the payment data:
  (i) loan data indicative of a loan status; and,
  (ii) investment data indicative of an investment status.

Preferably, the method includes, in the processing system, updating the loan status which is indicative of at least one of a balance of the loan, when the last payment was made, any overdue payments, redraws, and when any other payments are to be made.

In one embodiment, the method includes, in the processing system, updating the investment status which is indicative of a value of the investment, the average growth rate of the investment, any income due to the second party from the investment, when the last payment was made, when any portion of the investment was sold, and when any other payments are to be made.

Preferably, method includes the first party acquiring at least a portion of the investment when the first party receives less than a minimum payment from the second party.

In one embodiment, the method includes, in the processing system, determining the allocation by retrieving data stored in a data store.

Preferably, the method includes, in the processing system, determining the allocation using loan parameters and an allocation rate.

In one embodiment, the method includes, in the processing system, determining a new value for the allocation after receiving a payment from the second party.

Preferably the method includes, in the processing system, executing a computer software program in order to maintain the financial product.

Preferably the method includes the second party using at least a portion of the at least partially acquired investment to make payments to the first party.

In one embodiment, the method includes the processing system determining if the second party has paid at least one larger payment for the financial product.

Preferably, the method includes, in the processing system, determining any excess portion of payment which is to be used for repaying the loan or acquiring an investment.

In another embodiment, the method includes, in the processing system, recording an excess rule defined by the second party for determining whether the excess portion of payment is used for repaying the loan or acquiring the investment.

Preferably, the method includes, in the processing system, recording the excess rule which defines a first proportion of excess payment that is used for repaying the loan, and a second proportion that is used for acquiring the investment.

Preferably, if at the end of the loan term a shortfall exists between the balance of the loan and the value of the investment, the method includes, in the processing system, determining whether insurance was purchased by the second party and if insurance was purchased, submitting a claim to the insurance company.

Preferably, after a payment is received from the second party, the method includes, in the processing system, analysing the performance of the investment and providing, using current growth and dividend yield of the investment and economic parameters, a prediction of the value of the investment at the end of the loan term.

Preferably, the method includes, in the processing system, providing a statement including details of the loan and investment status, and the predicted value of the loan and investment at the end of the loan term.

In a fifth broad form, the present invention provides a process for providing a financial product from a first party to a second party, wherein the process includes:
  a) receiving loan parameters relating to a loan from the first party to the second party; and,
  b) determining, using the loan parameters and a repayment rule:
    (i) payments to be paid by the second party to the first party, and
    (ii) an allocation defining:
      (1) a first portion used for at least partially repaying the principal and/or interest on the loan; and,
      (4) a second portion used for at least partially acquiring an investment for the second party.

In a sixth broad form, the present invention provides a process for maintaining a financial product from a first party to a second party, wherein the process includes:
  a) the first party receiving a payment from the second party;
  b) the first party determining an allocation defining:
    i) a first portion used for at least partially repaying the principal and/or interest on a loan; and,
    ii) a second portion used for at least partially acquiring an investment;
  c) causing, using the second portion, the investment to be acquired; and,
  d) updating, in a processing system and using the payment:
    (i) loan data indicative of a loan status; and,
    (ii) investment data indicative of an investment status.

In a seventh broad form, the present invention provides software for providing a financial product from a first party to a second party, wherein the software performs, in a processing system, a method of:
  a) receiving loan parameters relating to a loan from the first party to the second party; and,
  b) determining, using the loan parameters and a repayment rule:
    (i) payments to be paid by the second party to the first party, and
    (ii) an allocation defining:
      (1) a first portion used for at least partially repaying the principal and/or interest on the loan; and,
      (5) a second portion used for at least partially acquiring an investment for the second party.

In an eighth broad form, the present invention provides software for maintaining a financial product from a first party to a second party, wherein the software performs, in a processing system, a method of:
  a) receiving payment data indicative of a payment from the second party to the first party;
  b) determining an allocation defining:
    i) a first portion used for at least partially repaying the principal and/or interest on a loan; and,
    ii) a second portion used for at least partially acquiring an investment;
  c) causing, using the payment data, the investment to be acquired; and,
  d) updating, in a store and using the payment data:
    (i) loan data indicative of a loan status; and,
    (ii) investment data indicative of an investment status.

BRIEF DESCRIPTION OF THE DRAWINGS

For a better understanding of the present invention and to understand how the same may be brought into effect, examples of the invention will now be described, with reference to the appended drawings in which.

DETAILED DESCRIPTION OF THE PREFERRED EMBODIMENTS

Figure 1:
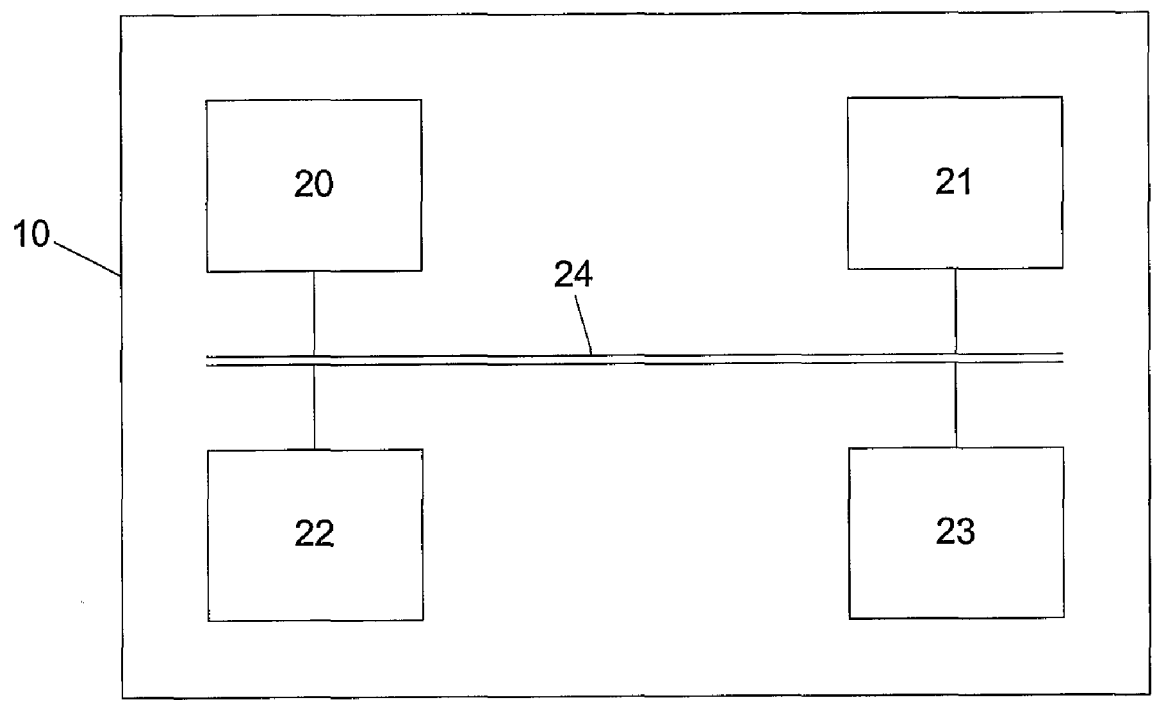
FIG. 1 illustrates an example of a processing system.

The following process relates to a method and apparatus for providing a financial product which allows a first party to offer a loan to a second party, such that when the second party makes repayments to repay the loan, a first portion of the repayments are used for repaying the loan, and a second portion of the repayments are used for acquiring an investment.

In one particular example, the first party may be an institution and the second party may be customer. For clarity, the present invention will herein be described in relation to an institution and a customer. However, it will be appreciated that other types of parties can be involved.

In prior art methods, when a standard loan is drawn down the customer's periodic payments, C, are in general calculated according to equation [1] shown below.

$$C = \frac{P}{\left[\frac{1-(1+i)^{-n}}{i}\right]} \quad [1]$$

where,
C=Periodic payment
i=Interest rate per period
n=Number of repayments required
P=Value of loan The payment C is used to pay the interest on the loan outstanding, P, and repay a portion of the loan, R. This relationship is described by equation [2].

$$C = iP + R \quad [2]$$

If the customer makes every required payment on the due date, makes no additional payments, and the interest rate remains unchanged during the life of the loan, the amount of the periodic payment, C, will be unchanged for the life of the loan. The value of the outstanding loan, P, and the portion of the payment used to repay the principal, R, changes with every payment.

If the interest rate, i, changes during the term of the loan, the institution recalculates the amount of the periodic payments using the formula above, taking into account the new interest rate, i, and the value of the loan outstanding P.

In contrast, when a loan is drawn down using the current method and apparatus described herein, a portion of the repayment, R, is used to fund an investment. The initial periodic loan payment, C, is calculated using equation [1] as for a standard loan. This relationship between portions used to repay the principal of the loan and acquire an investment is shown below by equation [3].

$$R = R_L + I \quad [3]$$

where,
$R_L$=Actual amount of loan principal repaid
I=Investment allocation

Because not all of the repayment, R, is directed to repaying the loan balance, the outstanding balance of the loan may not decrease as rapidly as it does for a standard loan. In the event of a rise in interest rates, the customer's current outstanding loan balance is not used in equation [1] to calculate the customer's new periodic payment. Instead the loan is divided into two parts:

Standard Principal, $P_S$—the balance of the loan if all the repayments had been used to repay loan balance instead of acquiring the investment; and Investment Principal, $P_I$—the additional loan balance due to the acquisition of the investment.

The total outstanding balance of the loan, P, is defined by equation [4].

$$P = P_S + P_I \quad [4]$$

The new value of the periodic payment, C, is then calculated using equation [1], with the standard principal, $P_S$, substituted for the total outstanding balance, P.

As the financial product includes splitting the repayments for the loan and the investment, the value of the investment at a period during the loan period may be greater than the outstanding balance of the loan. The customer may then sell at least a portion of the investment, or use income from the investment, to repay a portion or all of the outstanding balance of the loan, resulting in the customer acquiring the remaining portion of the investment at the completion of the loan and/or repaying the loan in a shorter period of time. Additionally, as only a single transaction needs to occur from the customer to the institution, the amount of data transfer is minimised.

Figure 5:
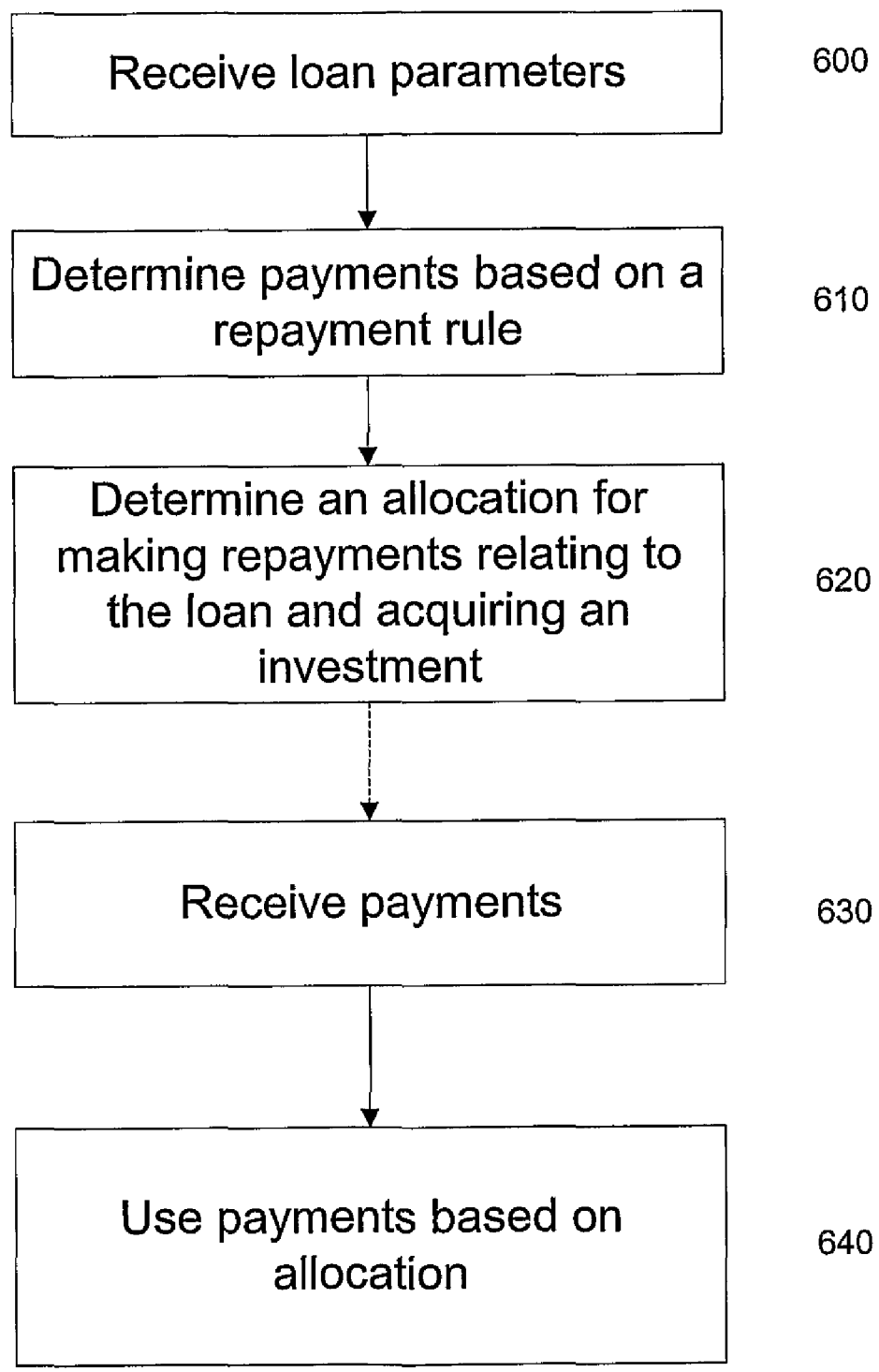

FIG. 5 shows an example of a process for providing a financial product and maintaining the financial product. In particular, step 600 includes receiving loan parameters. The loan parameters could be any value related to the loan, as will be described in more detail below. Step 610 includes determining payments based on a repayment rule, and this can be performed using the loan parameters. Step 620 includes determining an allocation for making repayments, which could relate to repaying the loan, the interest of the loan or the principal of the loan, and acquiring an investment.

Step 630 includes receiving payments. Step 640 includes using the payments based on the allocation. Steps 600 to 620 and 630 to 640 can be performed by separate entities, as depicted by the dotted lines between steps 620 and 630. This process shown in FIG. 6 is generally performed by a processing system, as will be described in more detail.

FIG. 1 shows an example of a processing system 10 suitable for performing a method of providing and maintaining the financial products. In particular, the processing system 10 generally includes at least a processor 20, a memory 21, and an input device 22, such as a keyboard, an output device 23, such as a display, coupled together via a bus 24 as shown. An optional external interface may be also provided. The processing system 10 is capable of executing computer software designed for creating and/or managing financial products.

Accordingly, it will be appreciated that the processing system 10 may be any form of processing system 10 suitably programmed to perform the method, as will be described in more detail below. The processing system 10 may therefore be a suitably programmed computer, laptop, palm computer, network or web server, or the like. Alternatively, specialised hardware or the like may be used.

In any event, it will be appreciated that suitable computer software in the form of computer executable software may be used in order to perform the methods described herein.

Figure 2:
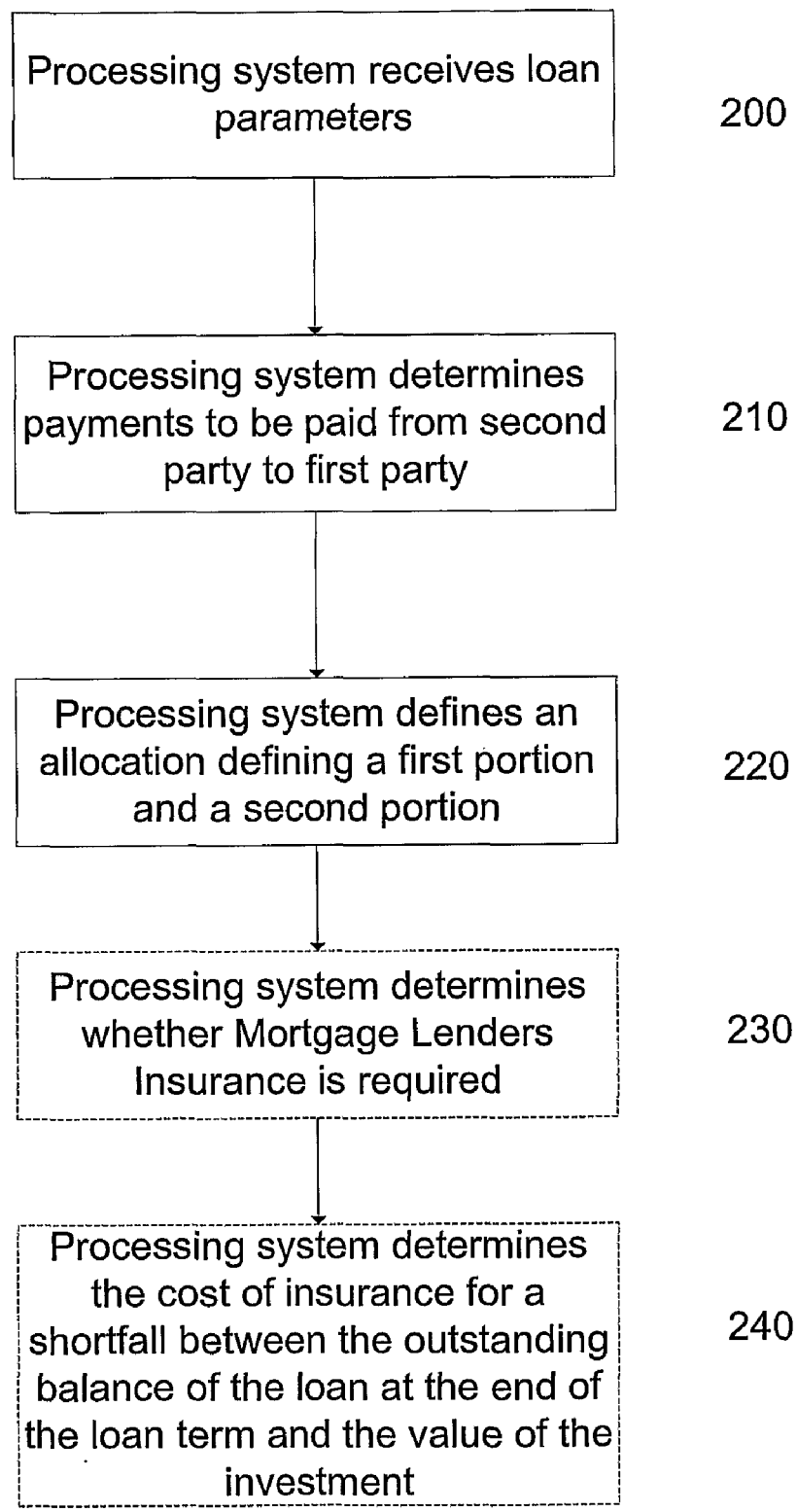
FIG. 2 illustrates an example flowchart of creating financial product.

An example of a method for providing a financial instrument for creating one or more combined loan and investment products will now be described with reference to FIG. 2.

As shown at step 200, the processing system 10 receives loan parameters relating to a loan from the institution to the customer. The processing system 10 for example may receive the loan data via an input device 22 such as a keyboard operatively connected to the processing system 10. However, it will be appreciated by those skilled in the art that other such input devices may be operatively connected to the processing system 10 in order to receive the loan parameters.

The loan parameters include two categories of data. This includes information regarding the loan, and economic parameters. The customer loan data may include the loan term and the total monetary value of the loan, which is agreed by the parties. It is also possible due to the combined nature of the financial product that the user may also specify the value of investment that they wish to acquire over the period of the loan. By inputting data related to the investment, redundant data can be minimised by the processing system 10 as the financial product combines both the loan and investment into a single financial product.

Other customer loan data that may be received by the processing system 10 may include the value of any current assets which the customer owns, the value of any liabilities which the customer may have outstanding, the income level of the customer, and the value of any security, commonly referred to in the art as collateral, provided to obtain the loan. People skilled in the art will appreciate that there are number of customer loan datum which may be provided to the processing system 10.

The economic parameters are indicative of past, current, and future economic conditions. These may include consumer price index (CPI), the annual growth rate of the investment, initial investment price, dividend yield percentage, interest/dividend offset, or tax arrangements, corporate tax rates, and personal tax rates. The economic parameters may be received via any input device commonly used in the art. The economic data may also be generated or forecast, as some of the parameters are estimates of future conditions.

At step 210, the processing system 10 determines, using the loan parameters and a repayment rule, payments to be paid from the customer to the institution. This is performed by using the values of the economic data and the customer loan data in the repayment rule, where the repayment rule defines a relationship between these factors to determine the payments to be made from the customer to the institution.

The repayment rule may be determined by selecting a repayment option and an income allocation option. The repayment of a loan can be allocated in a number of different ways. Any periodic income from the investment such as dividends from shares, distributions from unit trusts and/or interest from interest rate products can also be allocated in a number of different ways. To create the financial product a combination of a repayment option and income allocation option is selected to determine the repayment rule.

The loan repayment options available include:
1) Principal and Interest Loan;
2) Principal and Interest Loan—Maximum Allocation;
3) Interest Only Period; and
4) Agreed Repayment Scheme.

The income allocation options available include:
a) Allocated to loan;
b) Reinvested;
c) Proportionally split between the loan and the investment; and
d) Allocated to another account.

Each of these options will be discussed in further detail in later examples.

As a combination of one repayment option and one income allocation option is selected to determine the repayment rule, twelve possible combinations of methods exist. It will be appreciated that the processing system can receive data indicating a selection of the repayment and/or allocation options to determine the repayment rule. Alternatively, if no data is received by the processing system, a default selection of repayment and/or allocation option is used to determine the repayment rule for the financial product.

In accordance with an agreement between the institution and the customer, the repayment rule is determined in accordance with the customer making repayments at any regular interval (e.g. weekly, fortnightly, monthly, annually) during the loan term.

At step 220, the processing system 10 determines an allocation defining a first portion used for at least partially repaying the principal and/or interest on the loan, and a second portion used for at least partially acquiring an investment for the second party. The first portion may be defined to repay only the interest incurred from the loan, or may be defined to repaying the principal of the loan.

The processing system 10 uses an allocation rate in order to determine the proportion of payment, which is used for repaying the principal and/or interest of the loan and acquiring the investment. For example, the allocation rate may require 10% of the payment is to be allocated to the investment, while the remaining 90% of the payment is allocated for repaying the loan. This allocation rate may be defined by the institution, however it is also possible that the customer may request to acquire a particular amount of investment, and as such may nominate a percentage to be used. As will be discussed later, the allocation rate can be selected within a range of possible values.

People skilled in the art will appreciate that there may be a shortfall between the total first portion payments paid over the entire term of the loan and the outstanding balance of the loan at the end of the term due to the allocation of payments to the investment. However, by allocating a proportion of the payment to the investment, the investment can increase in value at a higher rate than the interest incurred by paying a smaller payment to repaying the loan. As such, the customer may decide at the end of the term that a portion of the investment may be used to repay the outstanding value on the loan. Therefore, the customer may have fully repaid the loan as well as having acquired an investment at the completion of the term of the loan. Furthermore, the period of the loan may be reduced due to the acquirement of the investment compared to traditional loans.

The allocation rate may be selected between a range of values. For the customer to acquire no investment, the allocation rate equals zero, and as such the financial product reverts to a standard loan. Thus, the minimum allocation rate for the financial product is shown below:

$$r_{min} > 0$$

However, the institution or customer may set a condition such that the investment acquired may not be less than a particular value during the life of the financial product. Therefore in order to achieve this condition, the allocation rate is calculated iteratively by the processing system 10 over the term of the financial product in order to acquire the desired investment. By using a processing system to iteratively calculate the allocation rate, a value for the allocation rate can quickly be determined.

For example, if the investment is in the form of shares, then the iterative calculation performed by the processing system 10 to determine the minimum allocation rate would be based on current share price, the share price growth and dividend growth, assuming that the customer continues to make the repayment during the term of the financial product regardless of any change in interest rates.

A maximum allocation rate ($r_{max}$) may also be determined using a number of variables and the selected repayment option chosen. The allocation rate for each type of repayment option is discussed in specific examples later.

Therefore the allocation rate may be selected from a range as shown below:

$$r_{min} \leq r \leq r_{max}$$

As will be apparent to people skilled in the art in light of the later examples, due to the maximum allocation rate being dependent on both the interest rate and the outstanding balance of the loan, the maximum allocation rate may vary over the course of the loan term due to changes in the interest rate and the outstanding value of the loan.

Optionally at step 230 (as indicated by the dotted outline), the processing system 10 determines whether Mortgage Lenders Insurance is required by the customer based on the loan parameters.

Optionally at step 240 (as indicated by the dotted outline), due to there being a possibility that a shortfall exists between the value of the investment and the outstanding balance of the loan at the end of the loan term, the processing system may determine the premium of insurance to cover this shortfall. This may include matching the risk profile of the created financial product. The processing system calculates the risk profile of the financial product by analysing input parameters such as loan data, investment data, economic parameters such as current performance of investments and the number of loan customers who refinance their loans during the loan term.

If the customer purchases such insurance for the financial product, the customer will not be required to pay the shortfall. It may also be possible that conditions must be met by the customer in order to qualify for the insurance to cover the shortfall. Such conditions may include that the customer has made every required payment in full and by the due date for the term of the loan; none of the customer's investment has been realised during the term of the loan; and, the customer has not terminated the loan prior to the end of the term of the loan.

Figure 3:
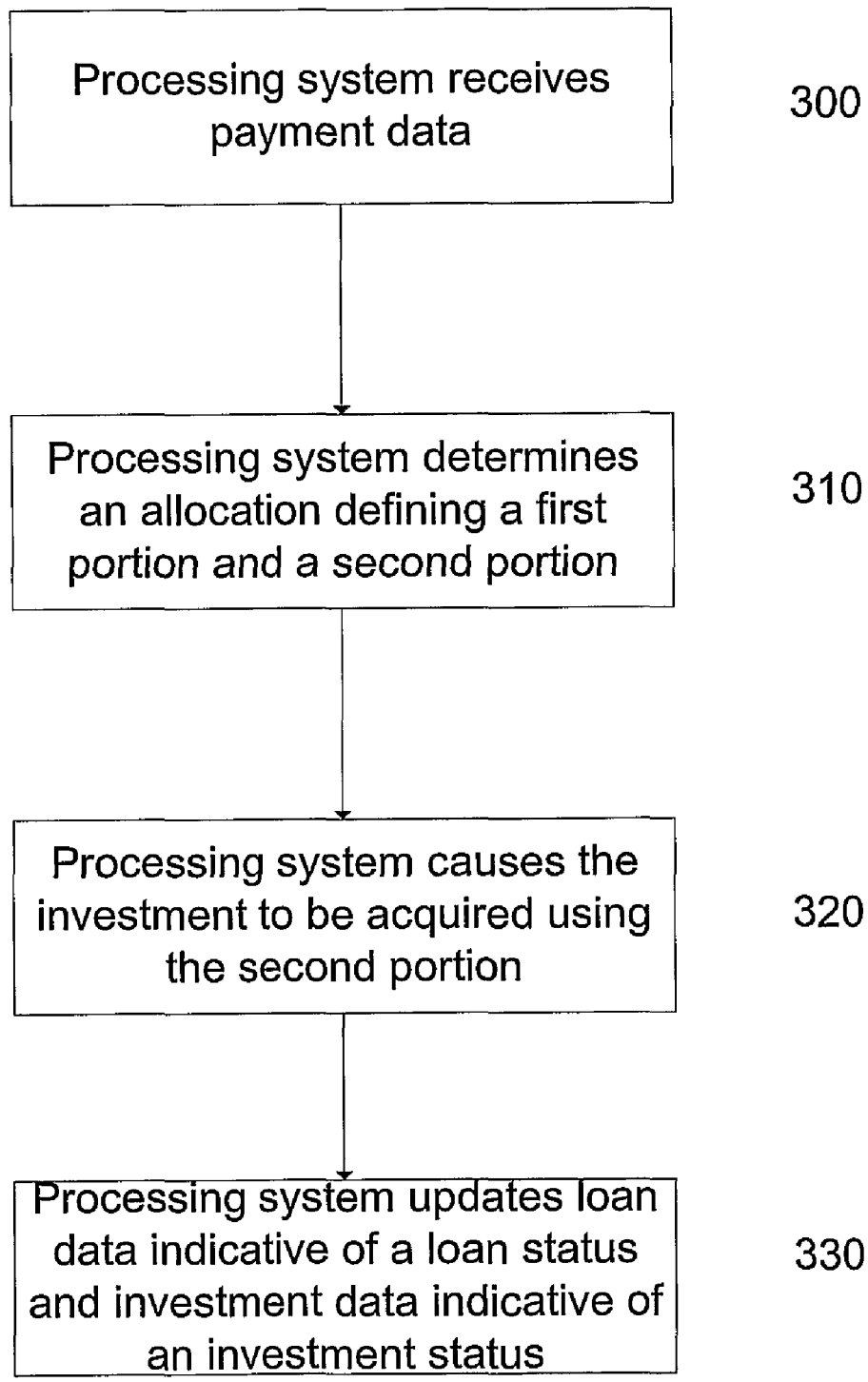
FIG. 3 illustrates an example flowchart of maintaining a financial product.

An example of a method for maintaining financial products between the institution and the customer will now be described with reference to FIG. 3.

At step 300 the processing system 10 receives payment data indicative of a payment from the customer to the institution. At step 310, the processing system 10 determines a allocation defining a first portion used for at least partially repaying a loan and a second portion used for at least partially acquiring an investment. At step 320, the processing system 10 causes, using the payment data, the investment to be acquired. At step 330, the processing system 10 updates, in a store and using the payment data, loan data indicative of a loan status, and investment data indicative of an investment status.

Figure 4A:
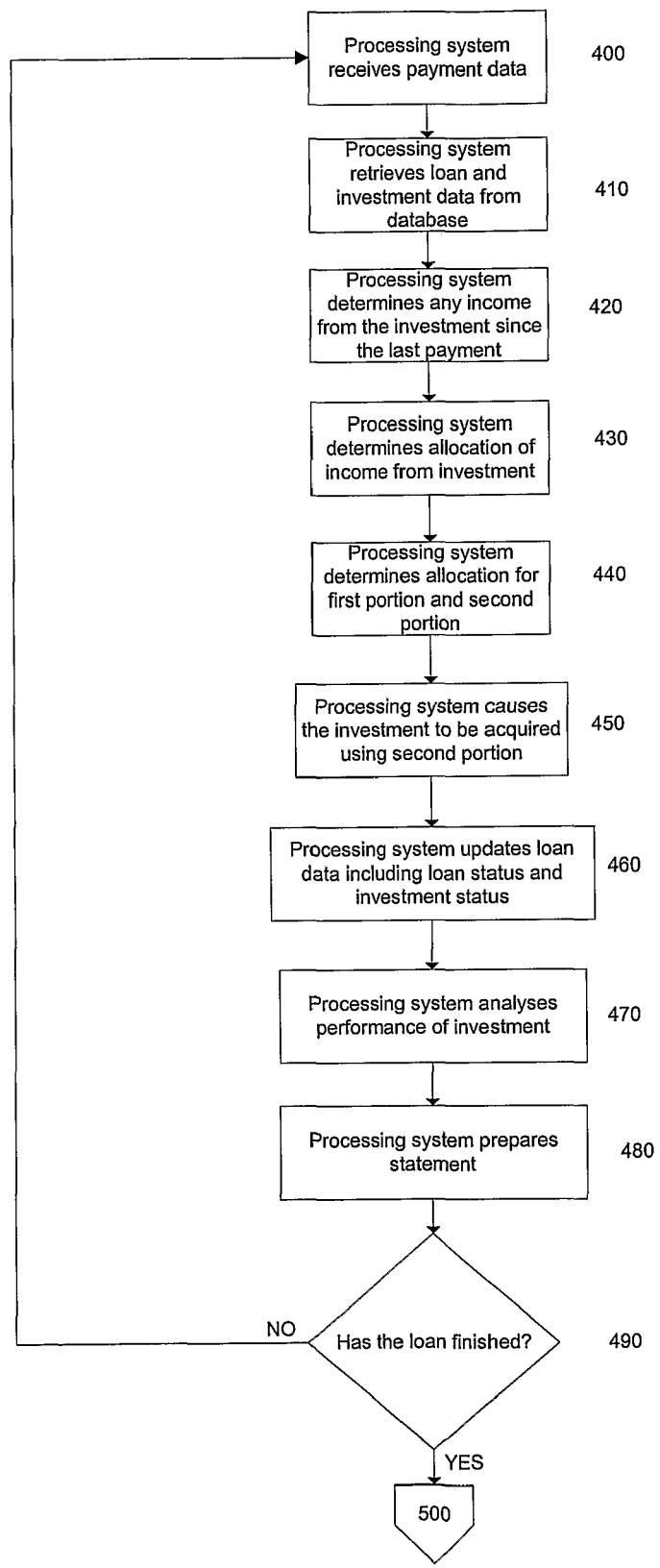
FIGS. 4A and 4B illustrates a more detailed example of maintaining a financial product; and, FIG. 5 illustrates an example flowchart of providing a financial product maintaining the financial product.
Figure 4B:
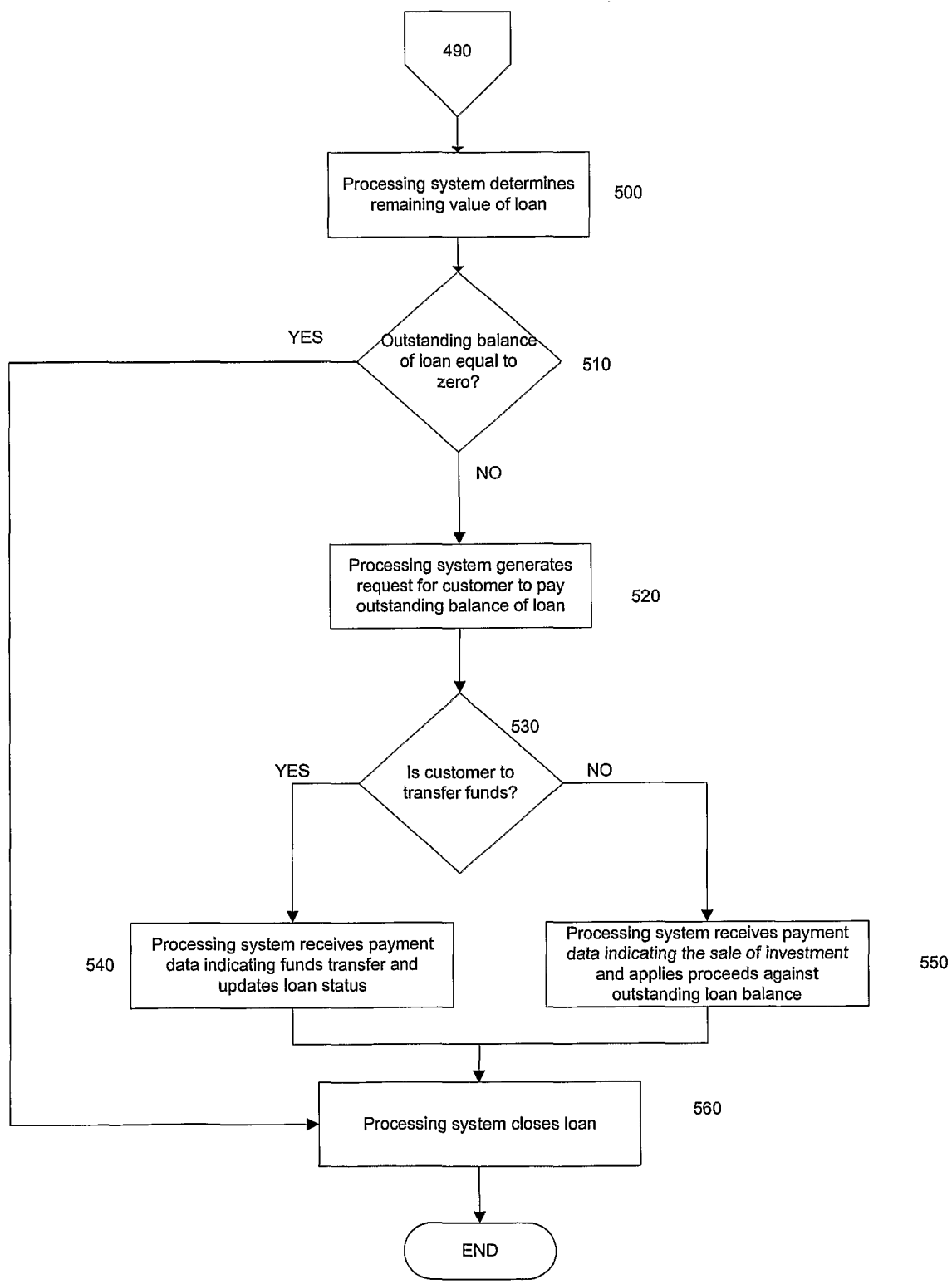

A more detailed example of a method for maintaining financial products between the institution and the customer will now be described with reference to FIGS. 4A and 4B.

At step 400, the processing system 10 receives payment data indicative of a payment from the customer to the institution. The payment data may be in the form of a financial transaction. Using the payment data the processing system 10 can determine the financial payment that was paid from the customer to the institution.

At step 410, the processing system 10 retrieves the loan and investment data from the database 21.

At step 420 the processing system 10 determines any income received from the investment (such as dividends) since the previous payment or allocation of income. At step 430 the allocation of this income is determined, according to the income allocation option selected. Some or all of the income from the investment may be used to repay the loan interest and/or principal. One particular advantage for a customer in some jurisdictions, such as Australia, is that the interest payable on the Investment Principal ($P_f$—refer equation [4]) is tax deductible and thus the customer may offset any income tax liabilities against the interest on the loan.

At step 440, the processing system 10 determines the allocation of the payment between the first portion and the second portion. The processing system 10 may determine the allocation of payment by using the records retrieved from the database 21 which may have been previously stored when the financial product was created. The record may be indicative of the first portion payment. Alternatively, the record may be indicative of the allocation rate for determining the first portion payment. It is also possible that the allocation may be determined on a payment-by-payment basis. Preferably, the processing system 10 recalculates the maximum allocation rate before and/or after each payment. This calculation takes into account the increase or decrease in the value of the investment, and as such allows the customer to adjust the allocation rate or payment value to vary the portions used for repaying the loan and acquiring the investment.

Generally, an allocation rate is used for determining the value of the second portion, which is to be used for acquiring the investment. Alternatively, a record may be retrieved from the database 21, which is indicative of the value of the second portion.

Optionally, a customer may pay the institution a repayment which is larger than the required payment. Therefore, the processing system 10 may implement an excess rule, which determines if the remaining portion of the payment should be used for repaying the loan or for acquiring further investment.

At step 450, the processing system 10 causes the investment to be acquired. This may be in the form of a financial transaction, such as the purchase of shares or units in a managed investment scheme.

At step 460, the processing system 10 updates loan data stored in a database 21. The loan data includes information representing a loan status and an investment status. The loan status represents at least one of the current loan balance, when the last payment was made, any overdue payments, any redraws made by the customer, fees incurred by the customer and the date of any other payments to be made. The investment status represents at least one of the value of the investment, the average growth rate of the investment, the income received from the investment, when the last payment was made, and the date of when any future payments are to be made. Therefore, the processing system 10 updates the loan data by, for example, reducing the loan balance, and additionally updates the investment data by, for example, increasing the investment balance.

At step 470, the processing system 10 analyses the performance of the investment and provides a prediction of the future value of the investment at the end of the loan term, using the current growth and dividend yield of the investment and the economic parameters.

At step 480, the processing system 10 causes a statement to be prepared providing details of the current loan and investment status, and details of the predicted value of the loan and investment at the end of the loan term. Advantageously, as the statement includes both the loan and investment details, the customer can easily determine the financial status of the financial product. Generally, the processing provides the statement in the form of a printed statement using a printer operatively connected to the processing system 10, or in an electronic format.

At step 490, the processing system 10 determines whether the term of the loan has finished or the balance of the loan is less than the loan principal repayment ($R_L$—refer equation [3]). This is determined by calculating the number and amount of the repayments that the customer has made to the institution. If the above conditions have not been met then the processing system 10 returns to step 400 waiting for the next payment from the customer to the institution. However, if the above conditions have been met, then the method continues to step 500.

At step 500, the processing system 10 determines the remaining value of the loan that is outstanding. This will be calculated using the loan status of the loan. If at step 510 the processing system 10 determines that the remaining value of the loan is zero, the system will proceed directly to step 560, closing the loan, updating the loan and investment status, and optionally releasing all securities held by the institution.

If the balance of the loan is greater than zero, the processing system generates a request for the outstanding balance of the loan to be paid by the customer at step 520. At step 530, the processing system receives data indicating whether the customer has decided to transfer funds to pay the outstanding balance, or whether at least a portion of the investment is to be sold.

If the customer elects to transfer funds, the processing system 10 processes payment data and updates the loan and investment data accordingly at step 540. If the customer elects to sell some or all of the investment, the processing system 10 causes at least some of the investment to be sold and applies the proceeds against the outstanding balance of the loan at step 550.

At step 560 the processing system 10 closes the loan, updates the loan and investment status, and optionally releases all securities held by the institution.

EXAMPLES

As previously discussed, there are a number of repayment options and income allocation options which can be combined to create a financial product. A description of each method will now be provided and an example using the relevant method. The following variables will be used throughout the following examples:
Loan value, P=$500,000
Total term=25 years
Assuming monthly repayments, n=12×25=300 months
Interest rate=7.5% p.a. ⇒ i=(0.075/12)=0.00625
Allocation rate, r=10%
Initial unit price=$1.0000
Unit growth rate=6% p.a.
Unit distribution yield=6% p.a.

It should also be noted that for these examples that it is assumed interest rate, and unit growth rate and distribution yield are constant over the life of the loan. As such, recalculations may need to be made.
Repayment Options
Principal and Interest Loan When the loan is drawn down, the periodic payment, C, is calculated as described above in equation [1].

The Investment Allocation, I, (referring equations [2] and [3]) is such that $$I = C - iP - R_L \quad [5]$$

and $$0 \leq R_L < (C - iP) \quad [6]$$

The Allocation Rate r is defined as:

$$r = \frac{I}{C} = 1 - \frac{(iP + R_L)}{C} \quad [7]$$

$$0 \leq r_{min} \leq r \leq r_{max} \quad [8]$$

where $$r_{max} = 1 - \frac{iP}{C}, \text{ i.e. } R_L = 0 \quad [9]$$

$r_{min}$ is arbitrarily determined

Thus, when the loan is drawn down, equations [1] and [7] may be combined to give:

$$r_{max} = (1+i)^{-n}$$

Using the example variables discussed above, when the loan is drawn down, the initial periodic payment, C, is calculated by the processing system as follows:

$$C = \frac{P}{\left[\frac{1-(1+i)^{-n}}{i}\right]}$$

$$= \frac{500,000}{\left[\frac{1-(1+0.00625)^{-300}}{0.00625}\right]}$$

$$= \$3,694.96$$

Therefore monthly payments for the loan are $3,694.96.
The processing system then determines the maximum allocation rate using equation [10], as shown:

$$r_{max} = (1+i)^{-n}$$
$$= (1+0.00625)^{-300}$$
$$= 15.43\%$$

Therefore initially the maximum permitted allocation rate r is 15.43%. An arbitrary allocation rate of 10% satisfies the condition stated in equation [8], as shown below:

$$0 \leq r \leq r \leq r_{max} = 15.43\%$$

Therefore, using the determined allocation rate, for the monthly investment allocation is determined by the processing system as shown below:

$$I = rC$$
$$= 0.1 \times 3694.96$$
$$= \$369.50$$

Thus, the monthly investment allocation is $369.50.

The total investment allocated over the life of the loan is shown below:

$$I_T = 300 \times 369.50$$
$$= \$110,850.00$$

Therefore, the total amount of repayments allocated toward the investment is $110,850.00.

Principal and Interest Loan—Maximum Allocation

The loan is a special case of the Principal and Interest loan described above and the periodic payments, C, as described in equation [1]. The loan term is divided into two phases.

In the first phase, the Investment Allocation includes the entire principal component of the loan repayment, i.e. in equation [5] $R_L=0$ and the allocation rate, r is such that $$r = 1 - \frac{iP}{C}$$

In the second phase, the Allocation Rate r, is (refer equation [8]):

$$0 \leq r_{min} \leq r \leq r_{max}$$

The second phase commences at the end of the first phase where the length of each phase is measured in time, and typically years.

Using the variables discussed above, the assumptions from the earlier example above still apply, but with the term being separated into two phases. These are:

Phase 1
Interest only term=5 years=60 months
Phase 2
Principal & interest term=20 years=240 months When the loan is drawn down, the initial periodic payment, C, is $$C = \frac{P}{\left[\frac{(1+i)^{-n}-1}{i}\right]}$$

$$= \frac{500,000}{\left[\frac{1-(1+0.00625)^{-(60+240)}}{0.00625}\right]}$$

$$= \$3,694.96$$

Therefore monthly payments for the loan are $3,694.96.
For phase 1, the processing system determines that:

$$r = r_{max}$$
$$= 1 - \frac{iP}{C}$$
$$= 1 - \frac{(500,000 \times 0.00625)}{3,694.96}$$
$$= 15.43\%$$

$$I = rC = \$569.96$$

The investment allocation in phase 1 is $569.96.
When phase 2 commences:

$$r_{max} = 15.43\%$$

Therefore the maximum permitted allocation rate r is 15.43%. The allocation rate of 10% satisfies the condition:

$$0 \leq r \leq r_{max} = 15.43\%$$

Therefore, for the monthly investment allocation:

$$I = rC$$
$$= 0.1 \times 3,694.96$$
$$= \$369.50$$

The monthly investment allocation is $369.50
The total investment allocated over the life of the loan;

$$I_T = \sum \text{Phase 1} + \sum \text{Phase 2}$$
$$= (60 \times 569.96) + (240 \times 369.50)$$
$$= \$122,877.60$$

Therefore, the total amount of repayments allocated toward the investment is $122,877.60

Interest Only Period

This repayment option has two distinct loan terms, an interest only term and a principal and interest term. The initial periodic payment for the loan, C, is calculated from a modified version of equation [1] as follows:

$$C = \frac{P}{\left[\frac{1-(1+i)^{-(n-k)}}{i}\right]}$$

where,
C=Periodic payment per period
i=Current interest rate per period
n=Total number of repayments
k=Number of interest only repayments
P=Value of loan In the first phase, the Investment Allocation includes the entire principal component of the loan repayment, and the allocation rate, r, is set at $r_{max}$ (refer equation [9]) i.e $$r = 1 - \frac{iP}{C}$$

In the second phase, the Allocation Rate r, is (refer equation [8]):

$$0 \leq r_{min} \leq r \leq r_{max}$$

The second phase commences after k repayments where the length of each phase is measured in time, typically years.

Using the sample values of the variables as discussed above, and the same assumptions as with earlier examples, but with an interest only term k of 5 years (60 months), the monthly payment is calculated as:

$$C = \frac{P}{\left[\frac{1-(1+i)^{-(n-k)}}{i}\right]}$$

$$= \frac{500{,}000}{\left[\frac{1-(1+0.00625)^{-240}}{0.00625}\right]}$$

$$= \$4{,}027.97$$

Therefore monthly payments for the loan are $4,027.97. The allocation rate is calculated as shown below.

$$r = 1 - \frac{Pi}{C}$$

$$= 1 - \frac{(500{,}000 \times 0.00625)}{4{,}027.97}$$

$$= 22.41\%$$

For the first phase, the monthly investment allocation is:

$I = rC = \$902.97$

The second phase commences after 5 years with the allocation rate, r reverting to 10% and still satisfying the requirement $0 \leq r_{min} \leq r \leq r_{max}$ From above $r_{max}$ is 22.41%. Therefore r of 10% is permitted. The monthly investment allocation is:

$$I = rC$$

$$= 0.10 \times \$4{,}027.97$$

$$= \$402.80$$

It would be expected that the total investment allocated over the life of the loan to be:

$$I_T = (60 \times 902.97) + [(300 - 60) \times 402.80]$$

$$= \$150{,}850.20$$

Under this scenario, the loan is paid off after 22 years, 1 month (265 months), therefore the total amount allocated to the investment is:

$$I_T = (60 \times 902.97) + [(265 - 60) \times 402.80]$$

$$= \$136{,}752.20$$

Therefore, the total amount of repayments allocated toward the investment is $136,752.20

Agreed Repayment Scheme

For this method, the loan has an arbitrarily agreed repayment and investment allocation. Firstly, the periodic payment C is determined such that:

$iP < C_{min} \leq C$ where
i=Current interest rate per period
P=Value of loan
$C_{min}$ is arbitrarily determined Secondly, the Allocation Rate, r, is also agreed and is determined such that (refer equations [7] and [8]):

$$0 < r \leq 1 - \frac{iP}{C}$$

Using the same values for variables and assumptions as for the above examples, the customer has agreed to repay $4,500 per month with $550 of the repayment going to an investment.
C=$4,500.00
I=$550.00
Determining whether these are suitable payment amounts $iP < C$ $iP = 0.000625 \times 500{,}000$ $= \$3{,}125.00 < C$ $= \$4{,}500.00$ Thus, the repayment of $4,500 per month is enough to cover the interest on the loan.

$$I \leq C - iP$$

$$C - iP = 4{,}500.00 - (0.000625 \times 500{,}000)$$

$$= 4{,}500.00 - 3{,}125.00$$

$$= \$1{,}375.00 \geq I$$

$$= \$550.00$$

Therefore, the investment allocation of $550 per month is within the surplus available after the interest on the loan has been paid.

For total investment allocated over the life of the loan;

$$I_T = 300 \times 550.00$$

$$= \$165{,}000.00$$

Therefore, the total amount of repayments allocated toward the investment is $165,000.00.

Income Allocation Options

Allocated to Loan

In this income allocation option, any income received from the investment is paid to the loan, thereby reducing the outstanding loan balance.

The treatment of interest and loan balance calculations is consistent with standard financial calculations.

All distribution income is paid to the loan. Using the outputs from the Principal and Interest Loan repayment strategy above, we have investment allocation of $369.50 per month.

Applying standard investment calculation techniques, and using the sample variables discussed above, at maturity of the loan we have:

Outstanding loan value=$53,804.26
Unit price=$4.465
Units purchased=56,397
Distribution income=$146,226.00
Investment value=(4.4650×56,397)=$251,812.61

Reinvested

Any income received from the investment is used to acquire more investment, thereby increasing the investment value. The investment can be any investment and does not have to be the investment that paid the income.

The treatment and calculations of acquiring a new investment is consistent with standard methods associated with the investment type.

In this example, we will assume that the outputs from the Principal and Interest Loan—Maximum Allocation repayment option is being used. As such, we have an investment allocation for phase 1 of $569.96 per month and for phase 2, $369.50 per month. Therefore the following is calculated:
Outstanding loan value=$389,001.42
Unit price=$4.4650
Units purchased=183,171
Distribution income=$366,925.46
Investment value=(4.4650×183,171)=$817,858.52
Proportionally Split Between the Loan and the Investment In this income allocation option, income received from the investment can be split between allocating it to a loan and reinvesting. The calculation would be such that:

$$d = d_L + d_I$$

and $$d_L = pd$$

$$d_I = (1-p)d$$

where
d=Total investment income
$d_L$=Investment income paid to loan
$d_I$=Investment income paid to investment
p=Proportion of income to be paid to loan In this example, distribution income is divided, with 75% allocated to the loan and hence 25% allocated to the investment. Using the outputs from the Interest Only loan repayment strategy above, we have investment allocation of $902.97 per month.

Applying investment calculation techniques, at maturity of the loan we have:
Outstanding loan value=$0
Unit price=$3.8445
Units purchased=113,307
Distribution income=$366,925.46
Investment value=(3.8445×113,307)=$427,969.28

Two important outcomes of the result above is that the outstanding loan value is $0 and the unit price is $3.8445. This has occurred because the combination of interest rates, investment allocation rate, unit growth, unit yield and income split have contributed to the loan being paid off early. Specifically, the actual term equals 270 months, equivalent to 22 years and 6 months. Therefore, this outcome is feasible.

Example of Maintaining Financial Products

A practical example of a method for maintaining financial products between an institution and a customer will now be described.

An institution has created a financial product that allows the customer to borrow $500,000 for 25 years at a variable interest rate that averages at 7.5% over the term of the loan. An allocation rate of 10% is used for determining the second portion of the payment used for acquiring the investment, which in this example are shares. The loan parameters that have been received by the processing system 10 includes:
  Customer initial annual income of $85,000;
  Consumer Price Index of 2.5%;
  Initial share price of $10 with annual growth of 6%;
  Dividend yield of 6% with all dividends fully franked;
  Dividend offset, ie. dividends contribute to the loan repayments with tax offset;
  Corporate tax rate of 30% with personal tax remaining at current levels; and
  The shares and property will be security on the loan.

It will be assumed that the repayment option is Principal and Interest Loan and that investment income is allocated to the payment of interest and/or principal of the loan.

The processing system 10 receives 300 monthly payments of $3,694.96 for the term of the loan. When the processing system 10 receives each monthly repayment, the processing system 10 determines using the above loan parameters and repayment rule, an allocation for the first and second portions. In this example the processing system 10 retrieves a record from the database 21 which is indicative of the allocation rate. Therefore, the determination of the first and second portions using the allocation rate is shown below:

$$\text{First Portion} = (1 - \text{allocation rate}) \times C$$
$$= (1 - 0.1) \times 3694.96$$
$$= 0.9 \times 3694.96$$
$$= \$3,325.46$$

$$\text{Second Portion} = \text{allocation rate} \times C$$
$$= 0.1 \times 3694.96$$
$$= \$369.50$$

At the end of the loan term, the share value is calculated as shown below.

$$\text{Share price} = 10.00 \times \left[1 + \frac{0.06}{12}\right]^{300}$$
$$= \$44.65$$

It is assumed that during the term of the loan, the customer has acquired 5650 shares. Therefore the total value of the investment is shown below:

$$\text{Investment Value} = \text{number of shares} \times \text{share price}$$
$$= 5650 \times 44.65$$
$$= \$252,272.50$$

The total payments paid from the customer to the institution total:

$$\text{Total Payments} = C \times n$$
$$= 3694.96 \times 300$$
$$= \$1,108,488.00$$

A proportion of the total payments is used for repaying the loan. This proportion is shown below:

$$\text{Total repayments on loan} = \text{second portion} \times n$$
$$= 3325.46 \times 300$$
$$= \$997,638.00$$

However, after the 300th payment the outstanding value of the loan is $54,354.20, where this value has been calculated excluding tax considerations and including share dividend considerations during the term of the loan. People skilled in the art will appreciate that the considerations for determining the outstanding value of the loan will vary from jurisdiction to jurisdiction, and as such similar exclusions and inclusions may be incorporated.

In this example, the customer decides to sell a portion of the shares at the completion of the loan in order to repay the outstanding value of the loan. The number of shares to be sold is calculated below:

$$\begin{aligned} \text{Shares to sell} &= \frac{\text{outstanding value of loan}}{\text{current share price}} \\ &= \frac{\$54{,}354.20}{\$44.65} \\ &= 1217.3 \text{ shares} \\ &\approx 1218 \text{ shares} \end{aligned}$$

As shares can only be sold in full, the total number of shares to be sold is rounded up to 1218 shares.

Thus, the customer sells 1218 shares to repay the outstanding value of the loan. Therefore, the processing system 10 updates the investment and loan status such that the loan status is reduced to zero and the investment status is reduced by the value of the shares sold. The customer is left with a portion of the investment remaining once the shares are sold to repay the remaining portion of the loan. The value of the shares at the completion of the loan is shown below:

$$\begin{aligned} \text{Investment Value} &= (\text{number of shares} - \text{shares sold}) \times \\ &\quad \text{share price} + (\text{shares sold} \times \text{share price} - \\ &\quad \text{outstanding value on loan}) \\ &= (5650 - 1218) \times 44.65 + \\ &\quad (1218 \times 44.65 - 54354.20) \\ &= 197888.8 + 29.5 \\ &= \$197{,}918.30 \end{aligned}$$

Therefore, over 25 years the customer has repaid the $500,000 loan to the Institution and has acquired shares with a value of $197,918.30.

Variations

It will be appreciated in light of the above examples that the investment which the customer at least partially acquires over the period of the loan may be used as security. Therefore, if the customer fails to repay a portion of the loan, the investment may be sold by the institution in order to recoup finding for the failed payments.

Furthermore, the customer may not be entitled to the investment until the entire loan has been repaid. Therefore, the customer may not be able to renegotiate the loan to have it transferred to a third party and still acquire the investment after the transfer. As such, this option may reduce customer turnover and increase customer loyalty toward the institution as the customer has some form of incentive in the form of an investment in order to repay the loan in full with the institution. It is possible that if the loan is renegotiated with a third party, then the investment may be used to repay administrative costs involved in the transfer, and the remaining balance of the investment may be used to reduce the value of the loan.

Alternatively, the customer may be allowed to sell some of the investment during the term of the loan, provided some predetermined conditions are met. For example, if at some time during the loan term the value of the investment is greater than the outstanding value of the loan, the customer may be allowed to sell the excess portion of the investment.

Optionally, if a shortfall occurs between the outstanding balance and the value of the investment, the processing system 10 may determine whether insurance was purchased by the customer when the financial product was created. If insurance was purchased, the processing system 10 may submit a claim to the insurer requesting payment of the shortfall.

Another option may include the institution offering a lower interest rate using the described financial products compared to other traditional financial products, thus providing an incentive to obtain a loan through the institution.

For example, an institution offers traditional home loans with a fixed interest rate of 6%. However, in order to persuade customers to obtain the described financial products through the institution, the institution increases the interest rate of the traditional home loan to 7%, and offers the financial product with an introductory interest rate of 6%. Thus, with the lower interest rate, and in combination with the acquisition of the investment during the term of the loan, customers will be persuaded to obtain the described financial products rather than more traditional loans.

A further option is that the institution offers the financial product with an initial interest rate, commonly referred to in the art as a "honeymoon rate", that is lower than the standard interest rate. For example, a home loan is obtained by a customer from an institution with an initial interest rate of 7%, and the monthly repayments are $3000. This rate increases to 7.5% at the 12-month stage of the loan. Thus, the customer is required to pay higher repayments in the order of $3200 compared to the initial repayments. As such, the customer is required to pay $200 more than initially required. Therefore, the customer may use the investment acquired during the period of lower interest rates to offset the increase in payments. This method can be used to negate the impact of variable interest home loans such that increases in repayments are reduced by the investment which may have been acquired during the period of lower interest rate. The customer or institution may set a rule in the software program(s) used to manage the financial product, which is executed by the processing system 10 such that at least a portion of the investment is sold to offset the increase in payments.

Another option would be for the customer to elect not to sell any portion of the investment acquired in order to offset any increase in payments.

A further option would be for the customer not to increase payments to accommodate higher interest rates, but simply to reduce the portion of the payment allocated to the investment, thus allocating a greater proportion to paying the interest and loan principal.

A further option is that the institution offers the financial product with an interest rate that decreases after a period of time, a rate commonly referred to in the art as a "loyalty rate". Thus after a period of time the customer is required to pay smaller repayments on the loan. Therefore, the money saved by incurring a lower interest rate is used to acquire an investment similarly to methods described above. To continue the previous example at the 24 month stage of the loan the interest rate reduces to 6.5%, and as such the repayments are also reduced to $2800. Therefore, the customer saves $200, and this saving is used to acquire investment similar to the methods previously described. The customer or institution may set a rule in the software program(s) used to manage the financial product, which is executed by the processing system 10 such that the savings are automatically calculated.

Alternatively, the customer may elect to not invest the savings such as to acquire an investment, and therefore the financial product performs as a standard loan.

It will be appreciated that the institution providing the loan can be at least one of a bank, an investment bank, a finance company, an insurance company, a fund manager, a superannuation manager, a hedge fund, an industry organisation, an association, a club, a society, managed investment schemes, an employee union, an industry cooperative, a Government, a publicly listed corporation, a broker, and a private corporation.

It will be appreciated that the investment which is made by the institution on the customer's behalf may make the investment in at least one of warrants, CFD and options and other forms of derivatives, shares, a unit trust, property, a property trust, a term deposit, a cash management account, bank bills, futures, foreign currency and commodities, superannuation products, or any other investment common in the art.

It will be appreciated that a number of different loans may be available for the customer to obtain from the institution. This may include at least one of an investment mortgage, an equity only loan, an interest only loan, a personal loan, a credit card, a secured loan, an unsecured loan, a margin loan, a line of credit, a foreign currency loan, a financial lease, an operating lease, a novated lease, bank bills, bonds, and interest rate swaps.

It will also be appreciated that a number of loan parameters exist which can include at least one of a value of the loan; a term of the loan; a value of the investment to be acquired by the second party; consumer price index; the annual growth rate of the investment; initial investment price; dividend yield percentage; dividend offset; distribution rate; corporate tax rates; and personal tax rates.

Before a customer obtains a financial product as discussed above, the customer may discuss his or her desired financial goals with a qualified employee of the institution, a broker, a financial planner or any other person. This discussion may include the use of the configured processing system to model the product outcomes for the customer depending on the input parameters. These input parameters may include at least one of the loan amount, term of the loan, current or potential interest rate, investment allocation rate, current or potential interest rate, investment dividend rate and the type of investment. The processing system allows for the parameters to be entered automatically or manually as required.

Additionally or alternatively, the customer may obtain information regarding the product via such media as written document, pamphlets, videos, and the Internet. In this case, the customer is supplied with a number of scenarios covering, for example, different loan amounts, repayment ratios and repayment methods. On the Internet, the customer is able to access the configured processing system via an interface to different scenarios to be investigated, according to his or her requirements. Alternatively, the customer's processing system may download software to configure their processing system to investigate different scenarios according to the customer's requirements.

Persons skilled in the art will appreciate that numerous variations and modifications will become apparent. All such variations and modifications which become apparent to persons skilled in the art, should be considered to fall within the spirit and scope that the invention broadly appearing before described.

For example, it will be appreciated that although some of the steps of the method herein before described can be performed by a processing system, a number of these steps may be performed without a processing system.

The invention claimed is:

1. An apparatus for providing a financial product from a first party to a second party, wherein the apparatus includes a processing system configured to:
   a) receive, by a processor of the processing system, loan parameters relating to a loan from the first party to the second party; and,
   b) determine, by the processor, using the loan parameters and a repayment rule, payments to be paid by the second party to the first party, and
   c) determine, by the processor, using the loan parameters and the repayment rule, a maximum allocation rate,
   d) apply, by the processor, an allocation rate, which is less than or equal to the maximum allocation rate, to the payments to determine,
   (1) a first portion of each payment used for at least partially repaying at least one of the principal and interest on the loan; and,
   (2) a second portion of each payment used for at least partially acquiring an investment for the second party; and (e) determine, by the processor, at the end of a loan period of the loan, whether at least a portion of the investment is to be sold to pay an outstanding amount for the loan, wherein the at least a portion of the investment is sold as a result of a positive determination.

2. The apparatus according to claim 1, wherein the processing system: a) receives data indicative of a selection of at least one of,
   (i) a loan repayment option from a plurality of loan repayment options; and (ii) an income allocation option from a plurality of income allocation options;
   and b) determines, using the selection, the repayment rule.

3. The apparatus according to claim 2, wherein the processing system:
   a) determines, using the selection, the maximum allocation rate; and
   b) receives data indicative of the allocation rate selected between a minimum allocation rate greater than zero and the maximum allocation rate.

4. The apparatus according to claim 1, wherein the processing system is configured to determine a premium for insurance for a shortfall between an outstanding balance at the end of the term of the loan and the value of the investment, and output a value of the premium of the insurance.

5. An apparatus for maintaining a financial product from a first party to a second party, including a processing system configured to:
   a) receive, by a processor of the processing system, payment data indicative of a payment from the second party to the first party;
   b) allocate, by the processor, according to an allocation rate which is less than or equal to the maximum allocation rate,
   i) a first portion of the payment for at least partially repaying the principal and interest on the loan; and,
   ii) a second portion of the payment for at least partially acquiring an investment;
   c) cause, by the processor, using the payment data, the investment to be acquired; and,
   d) update, by the processor, in a store and using the payment data:
   (i) loan data indicative of a loan status; and,
   (ii) investment data indicative of an investment status;
   (e) adjust, by the processor, the maximum allocation rate according to an alteration in the value of the investment acquired, wherein in the event that the allocation rate is greater than the maximum allocation rate, the allocation rate is adjusted to be equal to or less than the maximum allocation rate.

6. The apparatus according to claim 5, wherein the first party acquires at least a portion of the investment when the first party receives less than a minimum payment from the second party.

7. The apparatus according to claim 5, wherein the processing system is configured to determine the allocation rate by retrieving data stored in a data store.

8. The apparatus according to claim 5, wherein the processing system is configured to determine the allocation rate using loan parameters.

9. The apparatus according to claim 8, wherein the processing system is configured to adjust the allocation rate before or after receiving a payment from the second party.

10. The apparatus according to claim 5, wherein the processing system executes a computer software program in order to maintain the financial product.

11. The apparatus according to claim 5, wherein the second party uses at least a portion of the at least partially acquired investment to make payments to the first party.

12. The apparatus according to claim 5, wherein the processing system is configured to record an excess rule defined by the second party for determining whether the excess portion of payment is used for at least one of repaying at least a portion of the loan and acquiring at least a portion of the investment.

13. The apparatus according to claim 12, wherein the excess rule defines a first proportion of excess payment that is used for repaying the loan, and a second proportion that is used for acquiring the investment.

14. The apparatus according to claim 5, wherein if at the end of the loan term a shortfall exists between the balance of the loan and the value of the investment, the processing system is configured to determine whether insurance was purchased by the second party and if insurance was purchased, submit a claim to the insurance company.

15. The apparatus according to claim 5, wherein after a payment is received from the second party, the processing system is configured to analyse the performance of the investment and provide, using current growth and dividend yield of the investment and economic parameters, a prediction of the value of the investment at the end of the loan term.

16. The apparatus according to claim 15, wherein the processing system is configured to provide a statement including details of the loan and investment status, and the predicted value of the loan and investment at the end of the loan term.

17. A method for providing a financial product from a first party to a second party, wherein the method includes, in a processing system:
   a) receiving, by a processor of the processing system, loan parameters relating to a loan from the first party to the second party; and,
   b) determining, by the processor, using the loan parameters and a repayment rule, payments to be paid by the second party to the first party; and
   c) determining, by the processor, using the loan parameters and the repayment rule, a maximum allocation rate;
   d) applying, by the processor, an allocation rate, which is less than or equal to the maximum allocation rate, to the payments to determine,
      (1) a first portion of each payment used for at least partially repaying at least one of the principal and interest on the loan; and,
      (2) a second portion of each payment used for at least partially acquiring an investment for the second party; and
   (e) determining, by the processor, at the end of a loan period of the loan, whether at least a portion of the investment is to be sold to pay an outstanding amount for the loan, wherein the at least a portion of the investment is sold as a result of a positive determination.

18. The method according to claim 17, wherein the method includes, in the processing system:
   (a) receiving data indicative of a selection of at least one of,
      (ii) a loan repayment option from a plurality of loan repayment options; and
      (ii) an income allocation option from a plurality of income allocation options; and
   (b) determining, using the selection, the repayment rule.

19. The method according to claim 18, wherein the method includes, in the processing system:
   (a) determining, using the selection, the maximum allocation rate; and
   (b) receiving data indicative of the allocation rate selected between a minimum allocation rate greater than zero and the maximum allocation rate.

20. The method according to claim 17, wherein the method includes, in the processing system, determining a premium for insurance for a shortfall between an outstanding balance at the end of the term of the loan and the value of the investment, and outputting a value of the premium of the insurance.

21. The method according to claim 20, wherein the method includes, in the processing system, receiving data indicating whether the second party has decided to purchase the insurance.

22. A method for maintaining a financial product from a first party to a second party, wherein the process includes, in a processing system:
   a) receiving, by a processor of the processing system, payment data indicative of a payment from the second party;
   b) allocating, by the processor, according to an allocation rate which is less than or equal to a maximum allocation rate,
      i) a first portion of the payment used for at least partially repaying the principal and interest on a loan; and,
      ii) a second portion of the payment used for at least partially acquiring an investment;
   c) causing, by the processor, using the payment data, the investment to be acquired; and,
   d) updating, by the processor, in a processing system and using the payment data:
      (i) loan data indicative of a loan status; and,
      (ii) investment data indicative of an investment status,
   e) adjusting, by the processor, the maximum allocation rate according to an alteration in the value of the investment acquired, wherein in the event that the allocation rate is greater than the maximum allocation rate, the allocation rate is adjusted to be equal to or less than the maximum allocation rate.

23. The method according to claim 22, wherein method includes the first party acquiring at least a portion of the investment when the first party receives less than a minimum payment from the second party.

24. The method according to claim 22, wherein the method includes, in the processing system, determining the allocation rate by retrieving data stored in a data store.

25. The method according to claim 22, wherein the method includes, in the processing system, determining the allocation rate using loan parameters.

26. The method according to claim 25, wherein the method includes, in the processing system, adjusting the allocation rate one of before and after receiving a payment from the second party.

27. The method according to claim 22, wherein the method includes, in the processing system, executing a computer software program in order to maintain the financial product.

28. The method according to claim 22, wherein the method includes the second party using at least a portion of the at least partially acquired investment to make payments to the first party.

29. The method according to claim 22, wherein the method includes, in the processing system, recording an excess rule defined by the second party for determining whether the excess portion of payment is used for at least one of repaying at least a portion of the loan and acquiring at least a portion of the investment.

30. The method according to claim 29, wherein the method includes, in the processing system, recording the excess rule which defines a first proportion of excess payment that is used for repaying the loan, and a second proportion that is used for acquiring the investment.

31. The method according to claim 22, wherein if at the end of the loan term a shortfall exists between the balance of the loan and the value of the investment, the method includes, in the processing system, determining whether insurance was purchased by the second party and if insurance was purchased, submitting a claim to the insurance company.

32. The method according to claim 22, wherein after a payment is received from the second party, the method includes, in the processing system, analysing the performance of the investment and providing, using current growth and dividend yield of the investment and economic parameters, a prediction of the value of the investment at the end of the loan term.

33. The method according to claim 32, wherein the method includes, in the processing system, providing a statement including details of the loan and investment status, and the predicted value of the loan and investment at the end of the loan term.

* * * * *